UNITED STATES PATENT OFFICE.

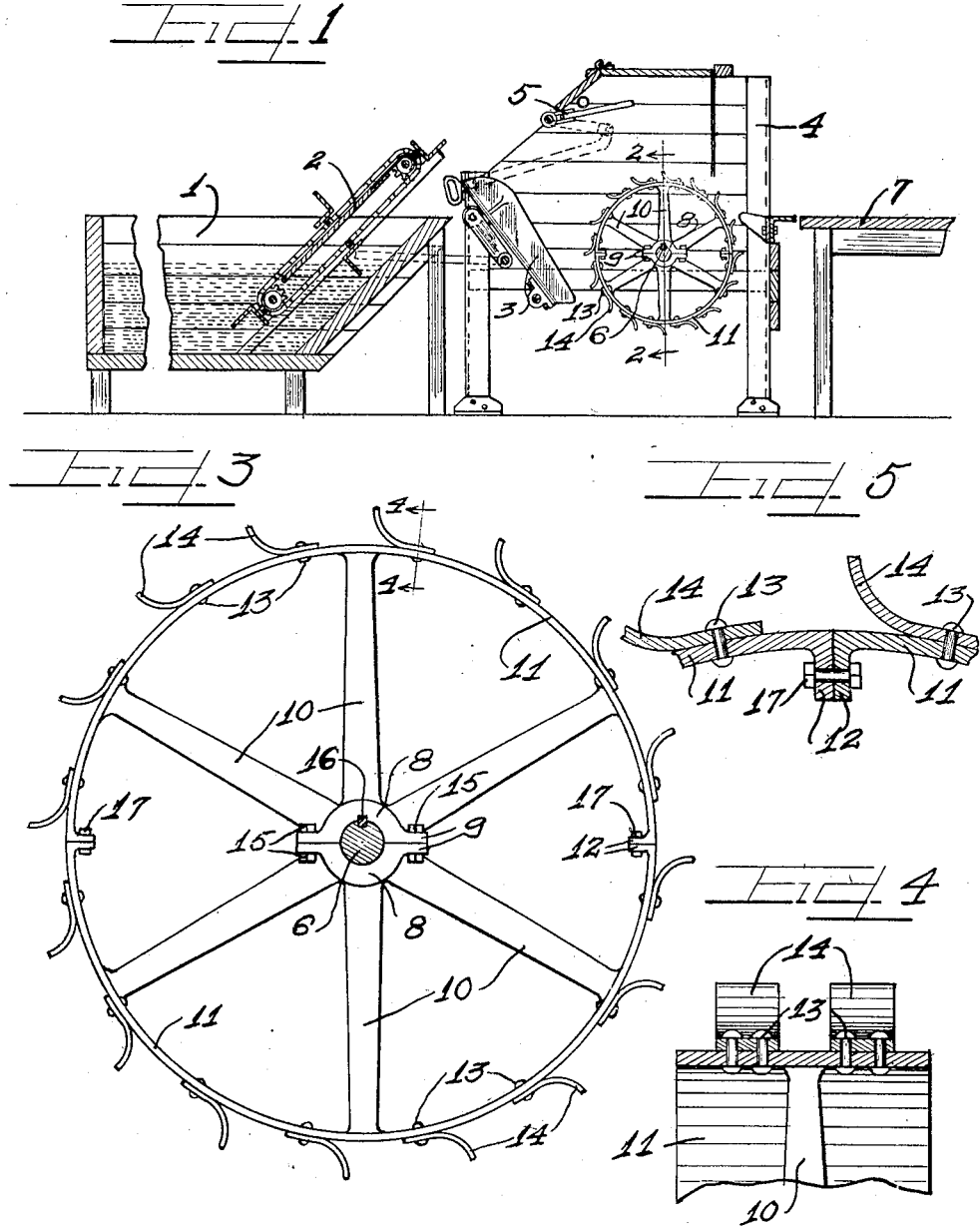

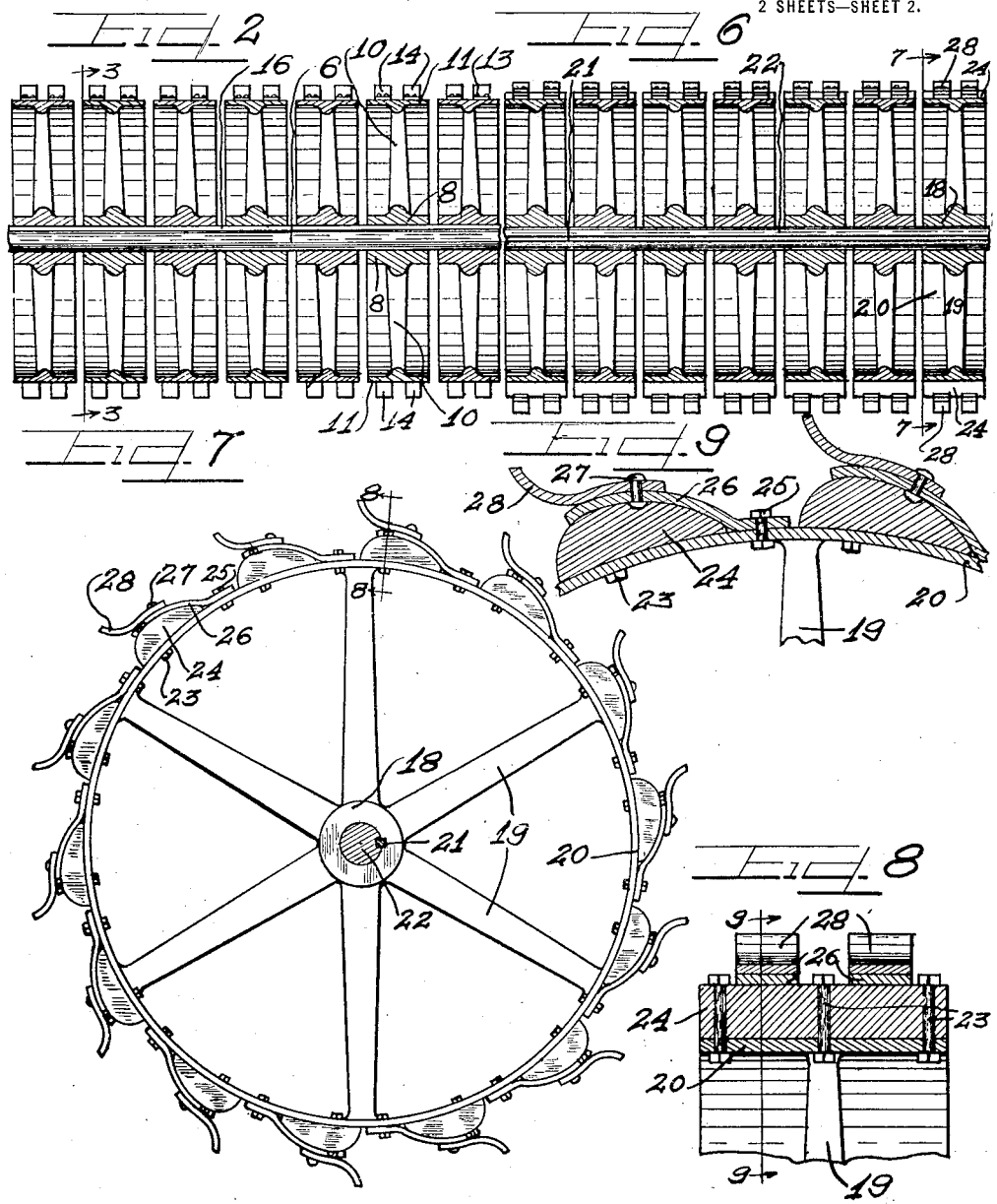

JOHN W. KOHLHEPP, OF CHICAGO, ILLINOIS, ASSIGNOR TO ALLBRIGHT-NELL CO., A CORPORATION OF ILLINOIS.

CARCASS-SCRAPING WHEEL.

1,347,639.  Specification of Letters Patent.  Patented July 27, 1920.

Application filed June 6, 1918. Serial No. 238,476.

*To all whom it may concern:*

Be it known that I, JOHN W. KOHLHEPP, a citizen of the United States, and a resident of the city of Chicago, in the county of Cook and State of Illinois, have invented certain new and useful Improvements in Carcass-Scraping Wheels; and I do hereby declare that the following is a full, clear, and exact description of the same, reference being had to the accompanying drawings, and to the numerals of reference marked thereon, which form a part of this specification.

This invention pertains more particularly to an improved form of a non-resilient carcass scraping wheel adapted when rotated to clean and dehair carcasses disposed in the field of operation thereof.

It is an object of this invention to construct a rigid scraping wheel provided with scraping blades for dehairing a carcass.

It is also an object of this invention to provide a non-flexible carcass scraping wheel.

Another object of the invention is the construction of a carcass scraping wheel having a flat rim for supporting scraping blades thereon.

It is a further object of this invention to provide a non-flexible carcass scraping wheel constructed to permit a plurality of similarly constructed wheels to be mounted adjacent one another to form a carcass scraping drum.

It is an important object of the invention to provide a carcass scraping wheel of simple and effective construction adapted to readily dehair a carcass disposed in the field of operation of the rotating wheel.

Other and further important objects of this invention will be apparent from the disclosures in the specification and drawings.

The invention (in a preferred form) is illustrated in the drawings and hereinafter more fully described.

On the drawings:

Figure 1 is a longitudinal sectional view of a carcass cleaning machine equipped with scraping wheels embodying the principles of this invention.

Fig. 2 is an enlarged detail section taken on line 2—2, of Fig. 1, showing a number of wheels used together to form a scraping drum.

Fig. 3 is an enlarged view of a scraper wheel taken on line 3—3, of Fig. 2.

Fig. 4 is an enlarged fragmentary detail section taken on line 4—4, of Fig. 3.

Fig. 5 is an enlarged fragmentary detail section taken through the wheel rim, showing the method of connecting abutting wheel sections.

Fig. 6 is a sectional view similar to that shown in Fig. 2, of a carcass cleaning drum made up of a plurality of wheels of a modified form.

Fig. 7 is an enlarged side view of the modified form of scraper wheel taken on line 7—7, of Fig. 6.

Fig. 8 is an enlarged detail section taken on line 8—8, of Fig. 7.

Fig. 9 is a fragmentary section taken on line 9—9, of Fig. 8.

As shown on the drawings:

The reference numeral 1, indicates a scalding vat, provided with a conveyer 2, adapted to deliver scalded carcasses upon an adjustable chute 3, which is pivotally mounted within a carcass cleaning machine 4, disposed to the rear of the scalding vat. The cleaning machine is provided with a carcass fall breaking mechanism 5, adapted to be manually operated to break the fall of carcasses entering the machine on the chute 3, to prevent the entering carcasses from striking against the carcass cleaning and dehairing mechanism with too much force.

The carcass cleaning and dehairing mechanism embraces an axle or shaft 6, which projects transversely through the machine and has the ends thereof journaled in suitable bearings mounted on the machine framework. The shaft 6, is connected with any suitable driving means for rotating the same. Keyed or otherwise secured in spaced relation on the shaft 6, adjacent one another are a plurality of independently removable carcass scraping or dehairing wheels, embodying the principles of this invention, and forming a rotatable cleaning drum mechanism adapted to co-act with the adjustable chute 3, for cleaning and dehairing carcasses and by adjustment of said chute causing the cleaned carcasses to be discharged over the drum through the open upper rear portion of the machine upon a receiving table or platform 7, disposed to the rear of the cleaning machine.

Each of the independently removable non-flexible or non-resilient carcass scraping or dehairing wheels, covering the principles of this invention comprises two semi-circular sections each embracing a half hub 8, having integral apertured flanges 9. Integrally formed on each of the half hubs 8, are the inner ends of a plurality of radial spokes 10, on the outer ends of which is rigidly secured or integrally formed a flat semi-circular rim section 11, having integrally formed on the ends thereof inwardly directed apertured flanges or lugs 12. Each rim section 11, has rigidly secured on the outer peripheral surface thereof, by means of rivets 13, or other suitable means, a plurality of rows of circumferentially disposed outwardly curved metal scraper blades 14. The rows of scraper blades may have the blades thereof disposed opposite those in an adjacent row as shown, or staggered with respect thereto, if preferred.

Each of the wheel sections are identical in construction and interchangeable. To form a scraper wheel two sections are engaged on the shaft 6, with the hub flanges 9, abutting one another to permit bolts 15, to be inserted through the registering apertures in said flanges to hold the sections clamped around said shaft. One of the sections is provided with a keyway or slot to receive the shaft key 16, therein to cause rotation of the wheel with the shaft. The rim flanges 12, also abut one another, and are secured together by means of bolts 17, or other suitable means, to form the complete wheel. It will of course be understood that the wheel may, if desired, be made of any number of similarly constructed sections, adapted to have the abutting flanges thereof removably connected together by bolts or other means.

The sectional construction of the scraping wheels permits removal of any one of the sections from the drum construction, and replacement thereof, without necessitating the removal of the other wheels from the drum shaft 6.

The modified form of scraping wheel shown in Figs. 6 to 9 inclusive, comprises a hub 18, having integrally formed thereon the inner ends of a plurality of radial spokes 19, to the outer ends of which is integrally formed or rigidly secured a flat rim 20. The hub 18, is provided with a keyway or slot to receive the key 21, of a drum shaft 22, for rotating the scraper wheel with said shaft. Rigidly secured on the outer peripheral surface of the rim 20, by bolts 23, or other means, are a plurality of spaced parallel cushions or pads 24, made of rubber or other suitable resilient material. The cushions 24, extend transversely across the rim 20. Rigidly secured to the rim 20, between each set of cushions 24, by means of bolts 25, or other means, are the mounting ends of a pair of scraper or massaging arms 26, which curve upwardly over the respective cushion 24, and normally rest thereon. Rigidly fastened to the upper or free end of each of the scraper arms 26, by rivets 27, or other means, is an outwardly curved scraper blade 28.

The operation is as follows:

In the form of scraper or massaging wheel shown in Fig. 3, the same may be readily clamped upon the cleaning machine shaft 6, by means of the bolts 15, and with the shaft key 16, engaged in the slot of one of the wheel sections. The rim flanges 12, are next secured together by the bolts 17, thus forming a rigid wheel construction provided with peripheral scraping blades 14, which project outwardly to massage and scape carcasses to clean and dehair the same, when said carcasses are disposed in the field of operation of the wheel when rotating. The action of the rotating wheel acts not only to scrape and clean a carcass but also tends to rotate the same while being acted upon.

Where a plurality of wheels are secured upon the same shaft to form a scraping drum, as shown in Figs. 1 and 2, repairs or replacement of any of the wheels or wheel sections may be made without requiring removal of the drum from the cleaning machine, or without disturbing or removing any of the other wheels forming the drum. A broken wheel section may, therefore, be replaced by simply removing the bolts 15 and 17.

The modified form of wheel shown in Fig. 7, is removably keyed on the shaft 22, to rotate therewith, to cause the scraper blades 28, thereof to rotate, scrape and dehair a carcass disposed in the field of operation of the rotating wheel. As the scraping blades strike the carcass the scraper arms 26, are forced against the respective cushions 24, which act to cushion said arms. A plurality of wheels may be secured on the same shaft, as shown in Fig. 6, to form a scraping drum for use in a cleaning machine, similar to that shown in Fig. 1.

I am aware that numerous details of construction may be varied through a wide range without departing from the principles of this invention, and I therefore do not purpose limiting the patent granted otherwise than necessitated by the prior art.

I claim as my invention:

1. A carcass cleaning and dehairing device comprising a rigid wheel, solid rubber pads rigidly secured on the wheel, arms bent to conform to the shape of said pads and resting on said pads, and scraper blades rigidly secured to said arms to project beyond the free ends thereof.

2. A carcass scraping device embracing a rigid wheel, resilient rounded pads secured transversely on the rim of the wheel, arms rigidly secured at one of their ends to the rim of the wheel and having the free ends resting on said pads, and scraper blades rigidly secured on the free ends of said arms and projecting beyond the ends thereof.

In testimony whereof I have hereunto subscribed my name in the presence of two subscribing witnesses.

JOHN W. KOHLHEPP.

Witnesses:
 FRED E. PAESLER,
 FRANK A. BREMER, Jr.